United States Patent
Yoshikawa

(10) Patent No.: US 12,370,969 B2
(45) Date of Patent: Jul. 29, 2025

(54) OCCUPANT PROTECTION DEVICE FOR VEHICLE

(71) Applicant: SUBARU CORPORATION, Tokyo (JP)

(72) Inventor: Mitsuharu Yoshikawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/383,774

(22) Filed: Oct. 25, 2023

(65) Prior Publication Data

US 2024/0149818 A1 May 9, 2024

(30) Foreign Application Priority Data

Nov. 8, 2022 (JP) ................................. 2022-179056

(51) Int. Cl.
  *B60R 21/0136* (2006.01)
  *B60N 2/427* (2006.01)
  (Continued)

(52) U.S. Cl.
  CPC ........ *B60R 21/0136* (2013.01); *B60N 2/4279* (2013.01); *B60R 21/01512* (2014.10); *B60R 21/207* (2013.01); *B60R 2021/0273* (2013.01)

(58) Field of Classification Search
  CPC .......... B60R 21/0136; B60R 21/01512; B60R 2021/0273; B60R 21/02; B60R 21/23138;
  (Continued)

(56) References Cited

U.S. PATENT DOCUMENTS 6,712,387 B1 * 3/2004 Breed ................... G01F 23/20
                                                  180/272
8,474,862 B2 * 7/2013 Pursche .............. B60R 21/0134
                                                  297/452.41
(Continued)

FOREIGN PATENT DOCUMENTS

JP     2003261000 A  *  9/2003  ....... B60R 21/23138
JP     2004291785 A  * 10/2004
(Continued)

OTHER PUBLICATIONS

Tatematsu Occupant protection device of Vehicle original and translation retreived Nov. 15, 2024 (Year: 1995).*

*Primary Examiner* — Paul N Dickson
*Assistant Examiner* — Caitlin Anne Miller
(74) *Attorney, Agent, or Firm* — MCGINN I.P. LAW GROUP, PLLC

(57) ABSTRACT

An occupant protection device for a vehicle including a seat on which an occupant is seated includes: a push up mechanism configured to push up an outer side part of a seat surface of the seat, in a vehicle width direction, relative to an inner side part of the seat surface; a pushing mechanism configured to push at least a shoulder of the occupant seated on the seat from an outer side toward an inner side in the vehicle width direction; an in-vehicle sensor configured to detect side collision to be made on the vehicle or a risk of the side collision to be made on the vehicle; and a controller configured to operate both the push up mechanism and the pushing mechanism when the in-vehicle sensor detects the side collision to be made on the vehicle or the risk of the side collision to be made on the vehicle.

8 Claims, 11 Drawing Sheets

(51) Int. Cl.
  *B60R 21/015* (2006.01)
  *B60R 21/02* (2006.01)
  *B60R 21/207* (2006.01)

(58) Field of Classification Search
  CPC ...... B60R 21/207; B60N 2/99; B60N 2/4235;
  B60N 2/4279
  USPC ...................................... 280/730.2
  See application file for complete search history.

(56) References Cited

U.S. PATENT DOCUMENTS

| | | | |
|---|---|---|---|
| 10,232,814 B2 * | 3/2019 | Gandhi | B60R 21/0134 |
| 11,110,883 B1 * | 9/2021 | Deng | B60R 21/264 |
| 11,505,097 B2 * | 11/2022 | Tanaka | B60R 21/207 |
| 11,541,785 B2 * | 1/2023 | Sugiyama | B60N 2/0256 |
| 11,787,361 B1 * | 10/2023 | Patel | B60R 21/2338 |
| | | | 280/730.2 |
| 11,851,020 B1 * | 12/2023 | Deng | B60R 21/23138 |
| 2021/0394698 A1 * | 12/2021 | Tanabe | B60N 2/777 |
| 2024/0092238 A1 * | 3/2024 | Lee | B60N 2/0276 |

FOREIGN PATENT DOCUMENTS

| | | | | |
|---|---|---|---|---|
| JP | 2008-56092 A | 3/2008 | | |
| WO | WO-2007077035 A1 * | 7/2007 | ........... | B60N 2/4235 |

\* cited by examiner

OCCUPANT PROTECTION DEVICE FOR VEHICLE

CROSS-REFERENCE TO RELATED APPLICATIONS

The present application claims priority from Japanese Patent Application No. 2022-179056 filed on Nov. 8, 2022, the entire contents of which are hereby incorporated by reference.

BACKGROUND

The disclosure relates to an occupant protection device for a vehicle.

On a side surface part of a vehicle body of a vehicle such as an automobile, another vehicle may collide.

When such side collision occurs, an occupant seated on a seat is more likely to be directly affected compared with frontal collision or the like for example, because it is difficult to secure a long distance for a gap from the side surface part of the vehicle body to the seat in the vehicle.

Japanese Unexamined Patent Application Publication (JP-A) No. 2008-56092 discloses a mechanism enabling an outer side part of a seat surface of the vehicle in a vehicle width direction to be pushed up relative to an inner side part of the seat surface, with an airbag, provided to the seat surface of the seat, deployed.

According to the description in JP-A 2008-56092, with the seat surface of the seat thus pushed up, the occupant seated can be swayed inward to be away from the side surface part of the vehicle body.

SUMMARY

An aspect of the disclosure provides an occupant protection device for a vehicle. The vehicle includes a seat on which an occupant is to be seated. The occupant protection device includes a push up mechanism, a pushing mechanism, an in-vehicle sensor, and a controller. The push up mechanism is configured to push up an outer side part of a seat surface of the seat, in a vehicle width direction of the vehicle, relative to an inner side part of the seat surface. The pushing mechanism is configured to push at least a shoulder of the occupant seated on the seat from an outer side toward an inner side in the vehicle width direction. The in-vehicle sensor is configured to detect side collision to be made on the vehicle or a risk of the side collision to be made on the vehicle. The controller is configured to operate both the push up mechanism and the pushing mechanism when the in-vehicle sensor detects the side collision to be made on the vehicle or the risk of the side collision to be made on the vehicle.

BRIEF DESCRIPTION OF THE DRAWINGS

The accompanying drawings are included to provide a further understanding of the disclosure and are incorporated in and constitute a part of this specification. The drawings illustrate embodiments and, together with the specification, serve to describe the principles of the disclosure.

DETAILED DESCRIPTION

With the simple pushing up of the outer side part of the seat surface of the seat as described in JP-A 2008-56092, the entire upper body of the occupant seated on the seat surface of the seat is less likely to be moved inward, A curtain airbag and a side airbag may be further deployed. However, these airbags are deployed along a side surface of the vehicle body, and are not largely deployed inward in the vehicle width direction, meaning that they are less likely to actually provide an effect of making the upper body of the occupant seated on the seat surface of the seat move inward.

Furthermore, the occupant seated on the seat surface of the seat does not have a rigid body as a whole, like known dummy dolls. For example, basically, a rigid member in the abdomen of a person is only the spine.

When such a human body skeleton is assumed, pushing up the outer side part of the seat surface of the seat as in JP-A 2008-56092 simply results in the pushing up of an outer side part of the pelvis, and is less likely to lead to the pushing up of the shoulders and the head above the pelvis, together with the pelvis. The expected behavior of the shoulders and the head in response to the pushing up of the outer side part of the pelvis is pushed up, is maintaining the original positions by means of gravity and inertial force. As a result, the occupant seated on the seat the outer side part of the seat surface of which is pushed up might have an outer side part of the abdomen, which is between the pelvis pushed up and the shoulders not moving, compressed. When an input by the side collision is further received in a state with such a compression, the outer side part of the abdomen of the occupant seated on the seat may be further compressed.

Thus, an occupant protection device of a vehicle is demanded to have improved occupant protection performance against the side collision.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

First Embodiment

Figure 1:
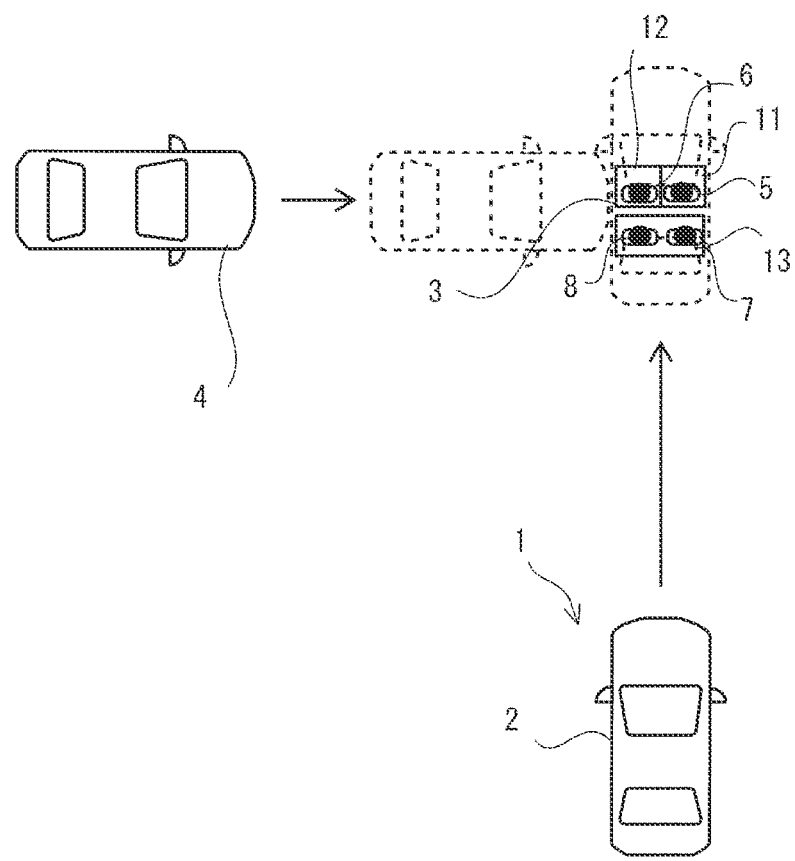
FIG. 1 is a diagram illustrating an example of a traveling state of an automobile according to an embodiment of the disclosure.

FIG. 1 is a diagram illustrating an example of a traveling state of an automobile 1 according to a first embodiment of the disclosure.

The automobile 1 is an example of a vehicle. The vehicle further includes a bus, a truck, and the like.

The automobile 1 in FIG. 1 is traveling upward from the lower side in the figure. FIG. 1 also illustrates another automobile 4 traveling from left to right in the figure.

The traveling of the automobile 1 may lead to collision with the other automobile 4 at a position indicated by a dashed line.

It is desirable that a driver 5 seated on a driver's seat 11, an occupant 6 seated on a passenger seat 12, and multiple occupants 7 and 8 seated on a back seat 13 of the automobile 1 remain safe after the collision.

Figure 2:
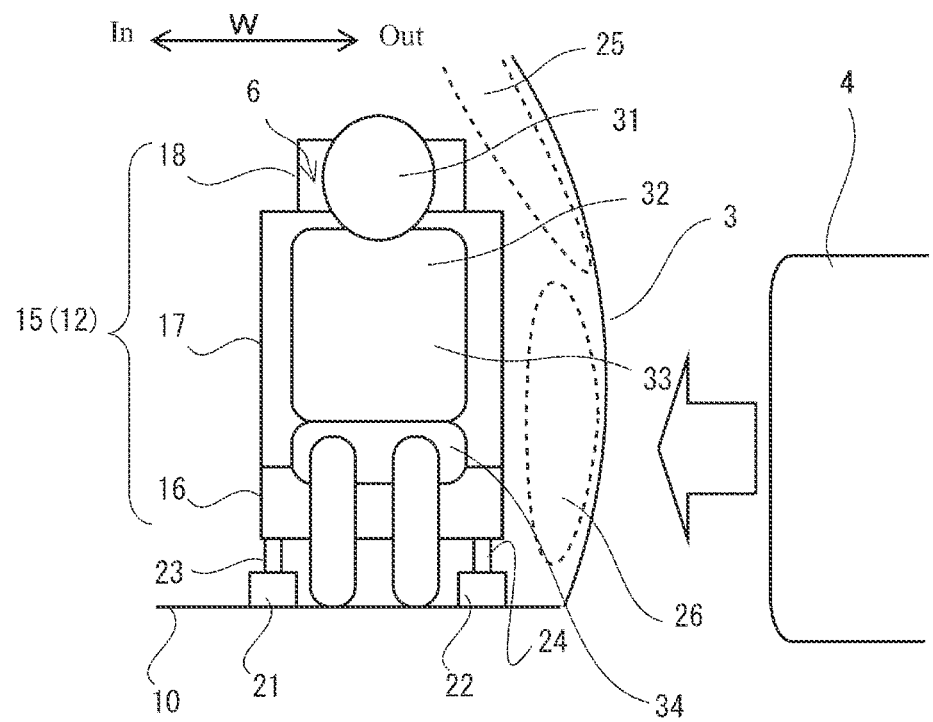
FIG. 2 is a diagram illustrating a state of the vehicle illustrated in FIG. 1 immediately before side collision by another automobile.

FIG. 2 is a diagram illustrating a state of the automobile 1 illustrated in FIG. 1 immediately before side collision by the other automobile 4.

Figure 3:
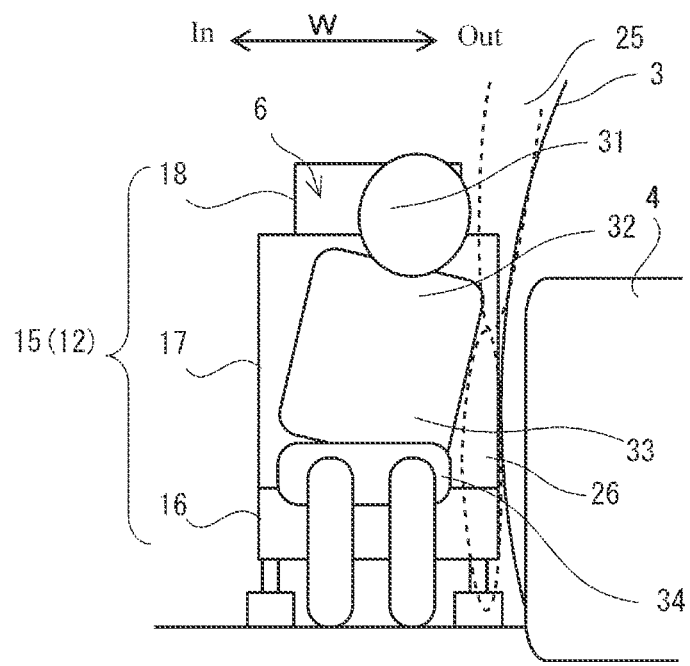
FIG. 3 is a diagram illustrating a state continuing from that in FIG. 2, where the other vehicle has made the side collision on the automobile illustrated in FIG. 1.

FIG. 3 is a diagram illustrating a state continuing from that in FIG. 2, where the other automobile 4 has made the side collision on the automobile 1 illustrated in FIG. 1.

The occupant 6 is seated on a seat part 16 of a seat 15 that is the passenger seat 12. A pelvis 34 of the occupant 6 is located on the seat part 16 of the seat 15. An abdomen 33 is located above the pelvis 34. A shoulder 32 is located above the abdomen 33. A head 31 is located above the shoulder 32. The same posture is taken also when the occupants is seated on the other seats 15, for example, on the driver's seat 11 or the back seat 13.

As illustrated in FIG. 2 and FIG. 3, the other automobile 4 makes the side collision on the automobile 1 in FIG. 1, that is, collides onto a left side surface part 3 of a vehicle body 2 of the automobile 1.

When such side collision occurs, the occupant 6 seated on the passenger seat 12 is more likely to be directly affected compared with frontal collision or the like for example, because it is difficult to secure a long distance for a gap from the left side surface part 3 of the vehicle body 2 to the passenger seat 12 in the automobile 1. The side collision involves a short crush stroke.

Thus, in the automobile 1, a curtain airbag 25 and a side airbag 26 are deployed between the left side surface part 3 of the vehicle body 2 and the passenger seat 12. Thus, even when the left side surface part 3 is deformed as illustrated in FIG. 3, the left side surface part 3 deformed is less likely to hit the occupant 6 seated on the passenger seat 12. The occupant 6 may be protected from direct contact from the left side surface part 3.

Still, this does not mean that the distance from the passenger seat 12 to the left side surface part 3 of the vehicle body 2 is no longer short. Thus, there is a demand for improvement in the occupant protection performance of the automobile 1 against side collision, to prevent the occupant 6 seated on the passenger seat 12 from being injured.

FIG. 2 also illustrates a vehicle width direction W of the automobile 1. The left side surface part 3 is located on the outer side in the vehicle width direction W, that is, on the right side in the figure, with respect to the passenger seat 12. The same applies to the description below.

Figure 4:
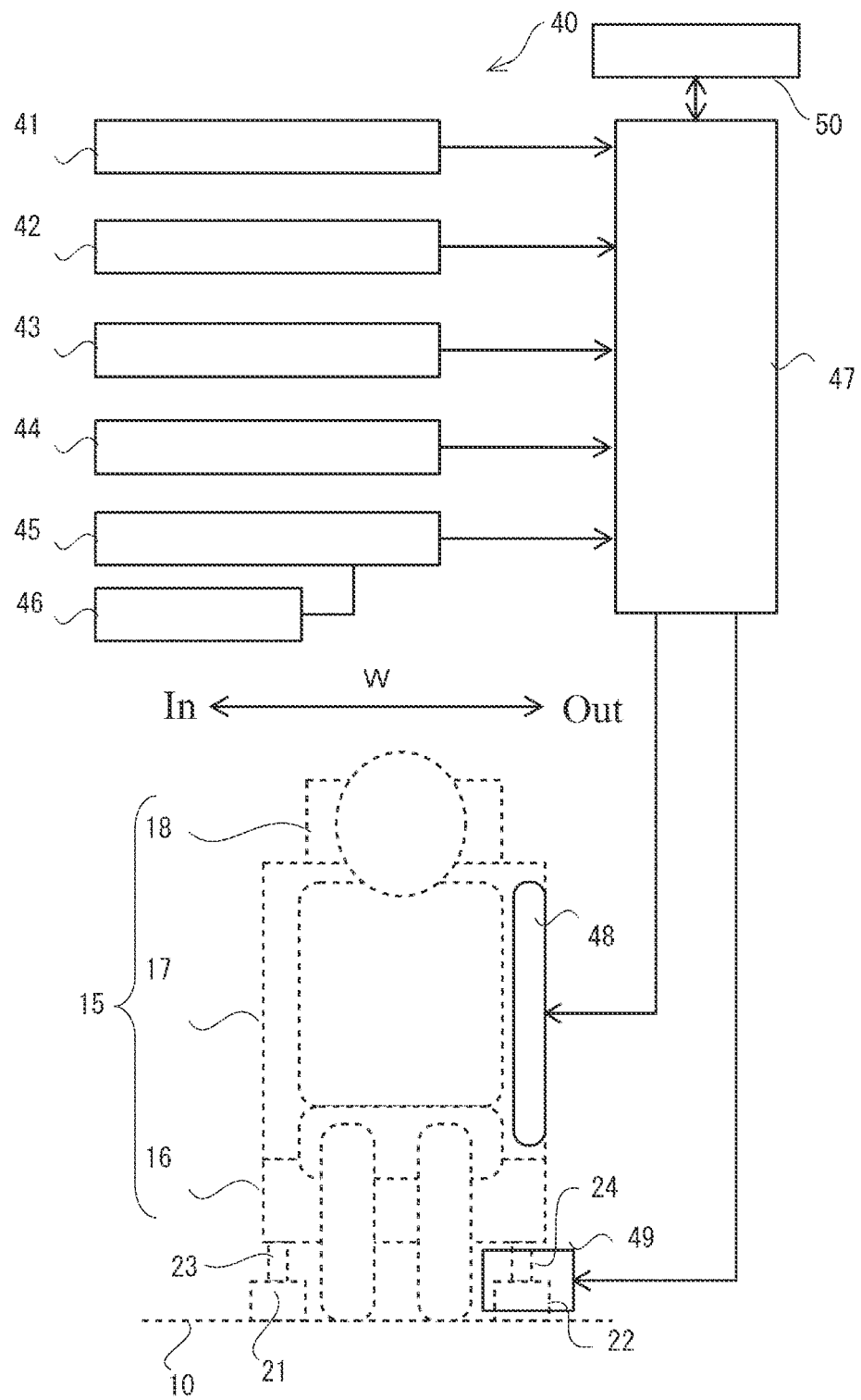
FIG. 4 is a diagram illustrating a control system that is provided in the automobile illustrated in FIG. 1, and serves as a vehicle occupant protection device.

FIG. 4 is a diagram illustrating a control system 40 that is provided in the automobile 1 illustrated in FIG. 1, and serves as a vehicle occupant protection device.

The control system 40 illustrated in FIG. 4 includes an external camera 41, an acceleration sensor 42, a seat occupancy sensor 43, a timer 44, an occupant monitor device 45, a pushing mechanism 48, a push up mechanism 49, a memory 50, and a CPU 47 coupled to these.

These peripheral members may be coupled to the CPU 47, through an internal bus of a control device including the CPU 47, a vehicle network to which multiple control devices are coupled, and the like. The multiple control devices provided in the control system 40 of the automobile 1 each include a CPU. The multiple CPUs may cooperate for the occupant protection. In FIG. 4, the passenger seat 12 is illustrated as an example of the seat 15 provided in the automobile 1. The seat 15 may be the driver's seat 11 or the back seat 13. The seat 15 includes the seat part 16, a back part 17, and a headrest part 18.

The control system 40 illustrated in FIG. 4 may include the pushing mechanism 48 and the push up mechanism 49 for seats other than the passenger seat 12 provided in the automobile 1, The external camera 41 is a camera that captures an image of the external of the automobile 1. The external camera 41 may be a monocular camera, compound eye camera, or an omnidirectional camera. With the compound eye camera, a relative distance and direction can be highly accurately calculated for an image capturing target object such as the other automobile 4, using the parallax based on how multiple cameras are disposed. With the monocular camera and the omnidirectional camera, a relative distance and direction can be calculated for the image capturing target object, based on the position of the target object in a captured image. Such an external camera 41 may serve as an in-vehicle sensor for detecting a risk of the side collision to be made on the automobile 1.

The acceleration sensor 42 detects the acceleration of the automobile 1. The acceleration sensor 42 may be a three-axis accelerometer detecting the acceleration in the forward-rearward direction, the vehicle width direction W, which is the left-right direction, and the upward-downward direction of the automobile 1, for example. Based on the accelerations in the three-axis directions detected by the acceleration sensor 42, the accelerations in pitch, roll, and yaw directions of the automobile 1 can be calculated. By integrating the acceleration in each of the directions, a pitch rate, a roll rate, and yaw rate can be calculated, Such an acceleration sensor 42 may serve as an in-vehicle sensor for detecting the side collision to be made on the automobile 1.

The seat occupancy sensor 43 may be provided to the seat part 16 of each seat 15 provided in the automobile 1 for example. With the seat occupancy sensor 43, values indicating whether an occupant is seated on the seat 15 provided with the seat occupancy sensor, and the weight of the occupant are detectable.

The timer 44 measures a time period and a time point.

An internal camera 46 serving as an occupant sensor is coupled to the occupant monitor device 45.

The internal camera 46 captures an image in the automobile 1 provided with the multiple seats 15. The internal camera 46 may be a monocular camera, a compound eye camera, or an omnidirectional camera. The internal camera 46 can capture an image of the occupant in the automobile 1.

Based on the captured image obtained by the internal camera 46, the occupant monitor device 45 may determine, for example, whether the occupant is seated on each seat 15 as well as the identity, the body size, and the like of each occupant. Such an occupant monitor device 45 may serve as the occupant sensor for detecting the body size of the occupant seated on the seat 15.

The pushing mechanism 48 is provided to a side support part 19 provided along the edge of the back part 17 of the seat 15, on the outer side in the vehicle width direction W of the automobile 1. It suffices if the pushing mechanism 48 includes at least a bag body 63 and an inflator 64 as described below. The bag body 63 is deployed by high pressure gas produced by the inflator 64 in response to an ignition signal. The bag body 63 deployed from the side support part 19 of the back part 17 of the seat 15 can push at least the shoulder 32 of the occupant seated on the seat 15 from the outer side toward the inner side in the vehicle width direction W.

The push up mechanism 49 may be of any configuration, as long as an outer side part of the seat surface of the seat 15 on which the occupant is seated in the vehicle width direction W of the automobile 1 can be pushed up relative to an inner side part of the seat surface as described below.

The memory 50 records a program executed by the CPU 47 and data. The memory 50 may include, for example, a semiconductor memory, an HDD, an SSD, and the like.

The CPU 47 loads and executes the program recorded in the memory 50. Thus, the CPU 47 serves as the controller of the occupant protection device.

The CPU 47 serving as the controller of the occupant protection device may operate both the push up mechanism 49 and the pushing mechanism 48, when the in-vehicle sensor detects the side collision to be made on or the risk of the side collision made on the automobile 1 as illustrated in FIG. 1 to FIG. 3.

Figure 5:
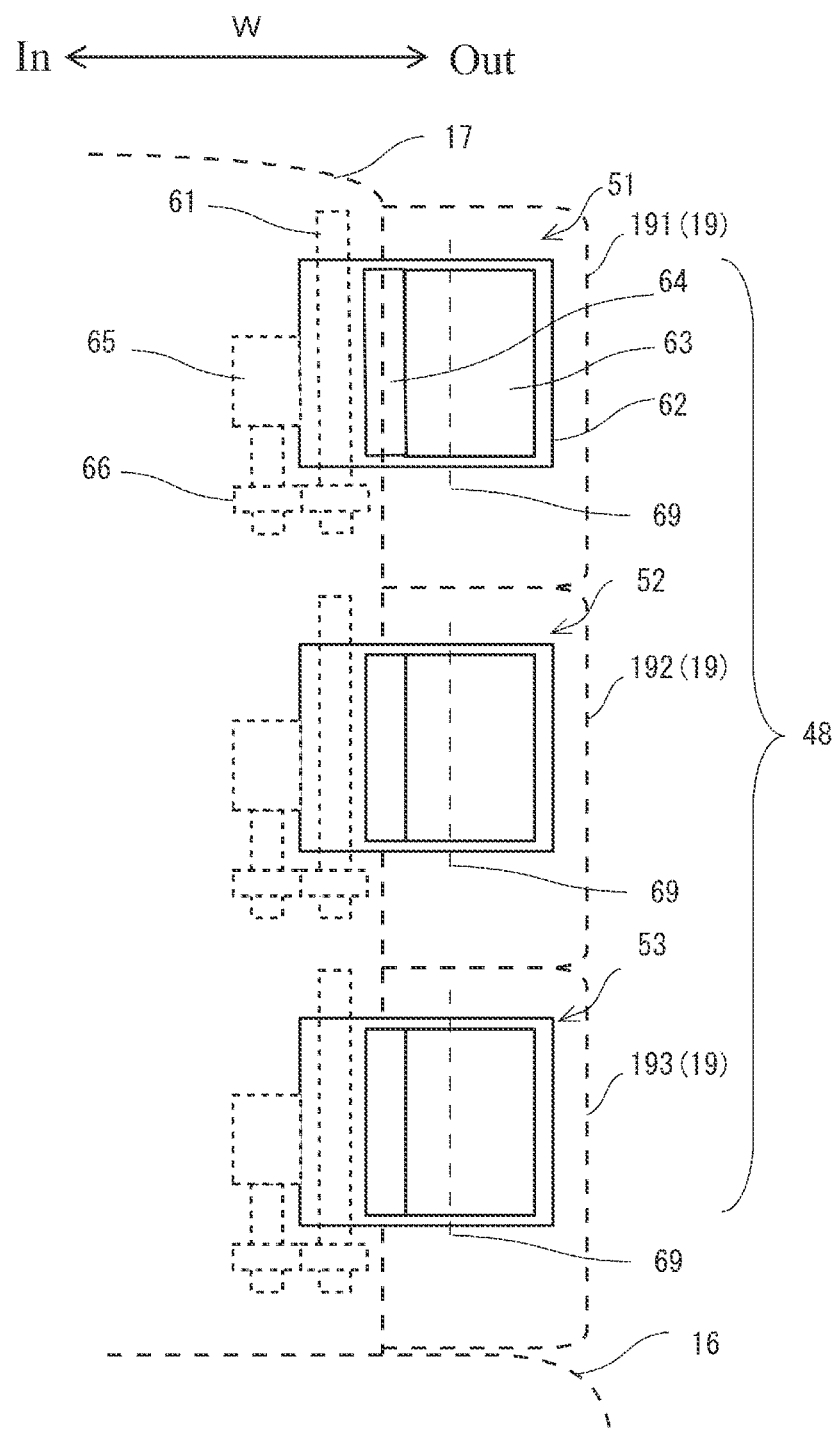
FIG. 5 is a diagram illustrating an example of a pushing mechanism illustrated in FIG. 4.

FIG. 5 is a diagram illustrating an example of the pushing mechanism 48 illustrated in FIG. 4.

Figure 6:
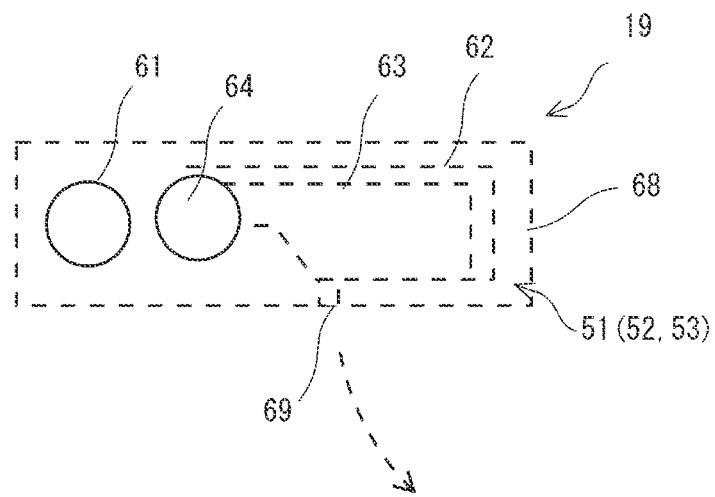
FIG. 6 is a lateral cross-sectional view of one pushing module of the pushing mechanism illustrated in FIG. 5.

FIG. 6 is a lateral cross-sectional view of one pushing module of the pushing mechanism 48 illustrated in FIG. 5.

In FIG. 5, the side support part 19 of the back part 17 of the seat 15 on the outer side in the vehicle width direction W is provided while being divided into an upper part 191, a middle part 192, and a lower part 193. The upper part 191, the middle part 192, and the lower part 193 of the side support part 19 are disposed along the edge of the back part 17 of the seat 15 on the outer side in the vehicle width direction W, in this order from the upper side.

The pushing mechanism 48 illustrated in FIG. 5 includes an upper-stage pushing module 51, a middle-stage pushing module 52, and a lower-stage pushing module 53. The pushing mechanism 48 may include four or more pushing modules, or may include two or less pushing modules.

These three pushing modules 51 to 53 are respectively provided in the upper part 191, the middle part 192, and the lower part 193 of the side support part 19. With this configuration, the three pushing modules 51 to 53 are disposed along the upward-downward direction in the side support part 19 of the back part 17 of the seat 15 on the outer side in the vehicle width direction W.

In FIG. 5, the back part 17 of the seat 15 and the side support part 19 are schematically illustrated in a state of being planarly deployed.

Each pushing module 51 (52, 53) includes a movable body 62, the bag body 63, the inflator 64, a movable shaft 61, a motor 65, and a gear member 66.

The movable body 62 is a substantially rectangular plate-shaped rigid body embedded in the upper part 191, the middle part 192, or the lower part 193 of the side support part 19. The substantially rectangular plate-shaped movable body 62 is provided with a recess part for accommodating the bag body 63.

The substantially rectangular plate-shaped movable body 62 has one end provided with a through hole that receives the movable shaft 61. The inflator 64 is fixed to the one end side of the substantially rectangular plate-shaped movable body 62. The inflator 64 is coupled to the bag body 63.

The motor 65 is provided at a position adjacent to the substantially rectangular plate-shaped movable body 62. The motor 65 is coupled to the CPU 47 serving as the controller. The motor 65 and the movable shaft 61 are coupled to each other by the gear member 66 to be capable of transmitting driving force to each other.

The movable shaft 61, the motor 65, and the gear member 66 of the multiple pushing modules 51 to 53 are disposed along the upward-downward direction of the back part 17 of the seat 15. These members may be fixed to an unillustrated seat frame of the back part 17 of the seat 15. Thus, the multiple pushing modules 51 to 53 including the movable body 62 and the bag body 63 are disposed along the edge of the back part 17 of the seat 15, on which the occupant is seated, on the outer side in the vehicle width direction W.

The multiple pushing modules 51 to 53 are stored in an urethane material 68 provided in the upper part 191, the middle part 192, or the lower part 193 of the side support part 19 of the back part 17 of the seat 15, as illustrated in FIG. 6 as an example. The urethane material 68 has one surface provided with a ruptured part 69 formed as a slit. In the upper part 191, the middle part 192, or the lower part 193 of the side support part 19, the ruptured part 69 formed as a slit extends in the upward-downward direction of the part, to overlap with the bag body 63 of the multiple pushing modules 51 to 53 as illustrated in FIG. 5. The bag body 63 deployed is surrounded by the substantially rectangular plate-shaped movable body 62, and thus ruptures the ruptured part 69 at the beginning of the deployment.

Figure 7:
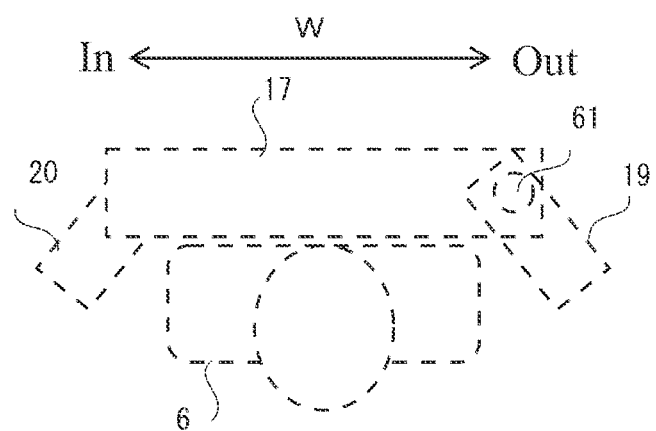
FIG. 7 is a diagram illustrating a state before the pushing mechanism illustrated in FIG. 5 is operated.

FIG. 7 is a diagram illustrating a state before the pushing mechanism 48 illustrated in FIG. 5 is operated.

As illustrated in FIG. 7, in a normal state without the side collision occurring, the side support part 19 on the outer side in the vehicle width direction W protrudes forward from the back part 17 of the seat 15, while being inclined at an angle that is the same as that of a side support part 20 on the inner side in the vehicle width direction W. Thus, the multiple side support parts 19 and 20 are located on the outer side and the inner side of the upper body of the occupant 6 seated on the seat 15, so that the upper body of the occupant 6 can be supported to be less likely to shift in the vehicle width direction W.

Figure 8:
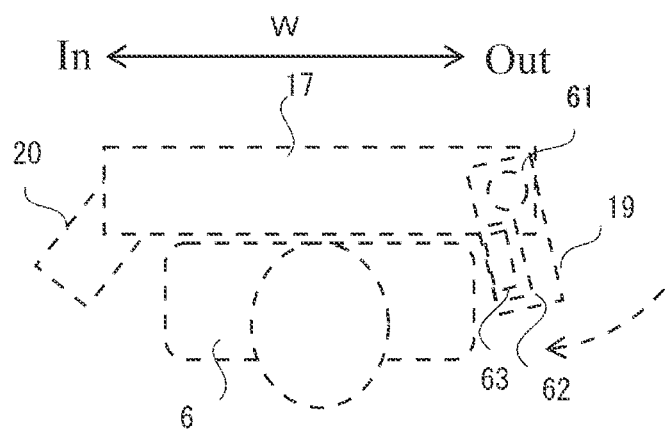
FIG. 8 is a diagram illustrating an operating state of a movable body of the pushing mechanism illustrated in FIG. 5.

FIG. 8 is a diagram illustrating an operating state of the movable body 62 of the pushing mechanism 48 illustrated in FIG. 5.

When the motor 65 is operated under the control by the controller, the substantially rectangular plate-shaped movable body 62 of the pushing mechanism 48 pivots around the movable shaft 61, to move to protrude forward from the position in the normal state illustrated in FIG. 7. Thus, the substantially rectangular plate-shaped movable body 62 moves to a deployed position on the outer side of the upper body of the occupant 6 seated on the seat 15. The bag body 63 accommodated in the substantially rectangular plate-shaped movable body 62 is located between the movable body 62 and the upper body of the occupant 6.

Figure 9:
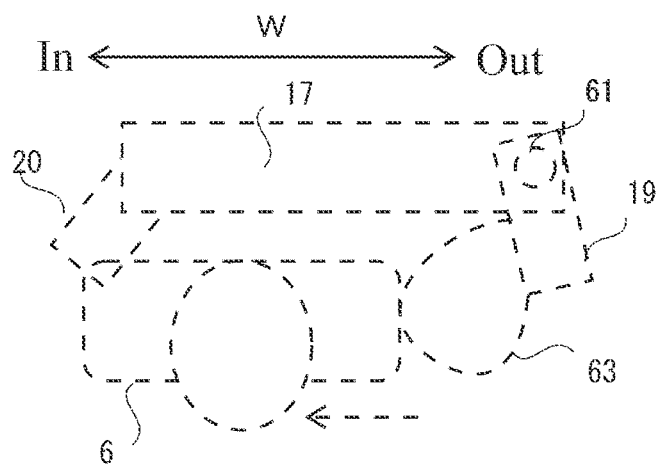
FIG. 9 is a diagram illustrating an operating state of a bag body of the pushing mechanism illustrated in FIG. 5.

FIG. 9 is a diagram illustrating an operating state of the bag body 63 of the pushing mechanism 48 illustrated in FIG. 5.

When the inflator 64 produces high pressure gas under the control by the controller, the bag body 63 of the pushing mechanism 48 deploys toward the occupant 6 from the movable body 62 on the outer side of the upper body of the occupant 6. The upper body including the shoulder 32 and the like of the occupant 6 can be moved by being pushed by the bag body 63 deployed inward in the vehicle width direction W.

As described above, the movable body 62 of the multiple pushing modules 51 to 53 of the pushing mechanism 48 is provided to the side support part 19 provided along the edge of the back part 17 of the seat 15 on which the occupant 6 is seated, on the outer side in the vehicle width direction W, and can reversibly move toward the occupant 6 seated on the seat 15.

The bag body 63 of the multiple pushing modules 51 to 53 of the pushing mechanism 48 is deployed on the occupant 6 side of the movable body 62, and can push and move the upper body including the shoulder 32 and the like of the occupant 6 inward in the vehicle width direction W.

Figure 10:
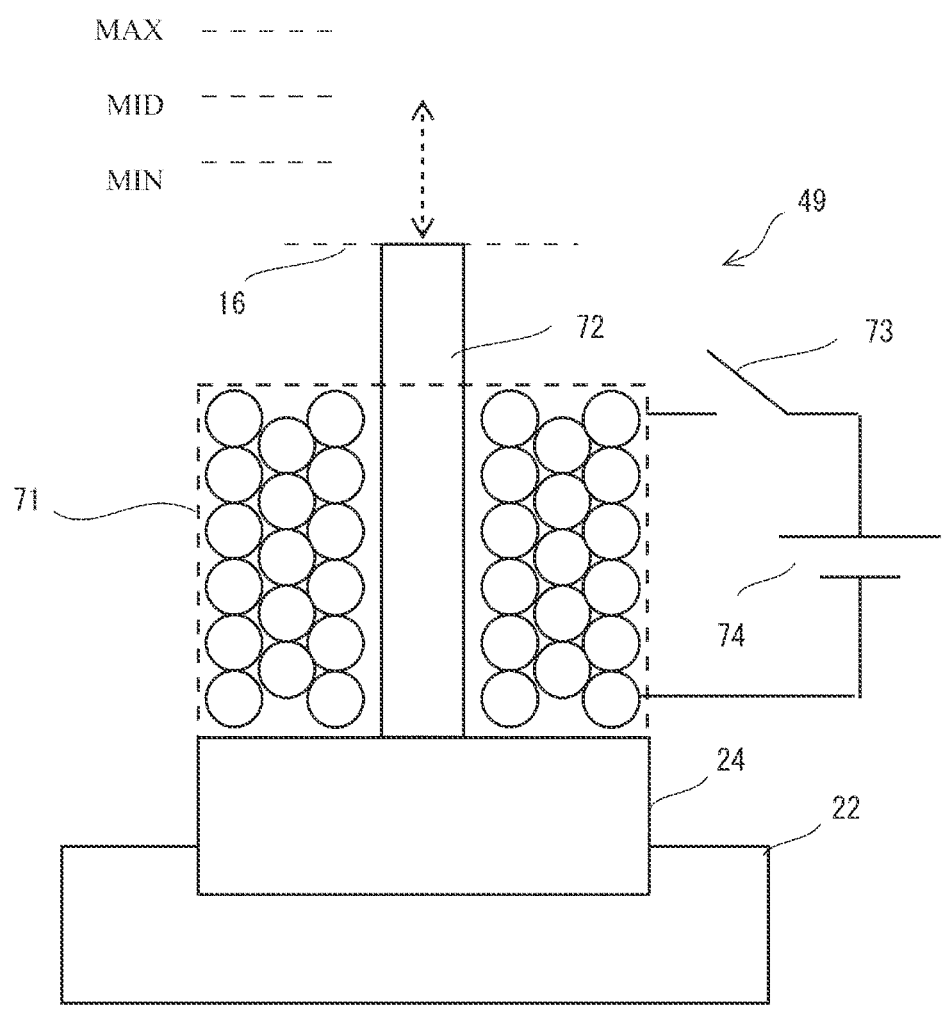
FIG. 10 is a vertical cross sectional view of a push up mechanism.

FIG. 10 is a vertical cross sectional view of the push up mechanism 49.

FIG. 10 illustrates the seat part 16 of the seat 15, as well as an outer side rail 22 for attaching the outer side part of the seat part 16 of the seat 15 in the vehicle width direction W to the vehicle body 2, and a slider 24 that moves on the outer side rail 22.

The push up mechanism 49 illustrated in FIG. 10 is disposed between the seat part 16 of the seat 15 and the slider 24.

The push up mechanism 49 includes a drive coil 71, a shaft member 72 provided at the center of the drive coil 71, and a switch 73.

The drive coil 71 may be obtained by winding a copper wire into a hollow coil shape for example.

The shaft member 72 is disposed at the center of the drive coil 71 to be movable up and down.

The switch 73 is provided in a closed loop circuit coupling the drive coil 71 and a battery 74 of the automobile 1 to each other. The switch 73 may be opened and closed under the control by the controller.

When the switch 73 is open, the drive coil 71 produces no magnetic force. In this case, as illustrated in FIG. 10, the shaft member 72 is on the slider 24.

When the switch 73 is closed, the drive coil 71 produces magnetic force. The shaft member 72 can move upward.

The force of the drive coil 71 for moving the shaft member 72 upward can be controlled based on a cycle at which the switch 73 is opened and closed by the controller or the like. The shaft member 72 can be, as illustrated in the figure, pushed up to a minimum position, to a middle position, and to a maximum position. The outer side part of the seat part 16 of the seat 15 in the vehicle width direction W may be pushed up relative to the inner side part of the seat part 16 of the seat 15 in the vehicle width direction W, based on the push up amount of the shaft member 72. The inclination of the seat part 16 changes in accordance with the push up amount of the shaft member 72.

As illustrated in FIG. 4, an inner side slider 23 moving on an inner side rail 21 for attaching the inner side part of the seat part 16 of the seat 15 in the vehicle width direction W to the vehicle body 2 may be pivotally coupled to the seat part 16 of the seat 15, using a link member or the like for example. Thus, the outer side part of the seat part 16 of the seat 15 can be more easily pushed up relative to the inner side part.

Thus, the push up mechanism 49 includes electromagnetic actuators (71 and 72) that reversibly push up the outer side part of the seat part 16 of the seat 15, on which the occupant is seated, in the vehicle width direction W of the automobile 1, relative to the inner side part of the seat part 16.

The inner side rail 21 and the outer side rail 22 extend in the forward-rearward direction of the vehicle body 2, on a floor surface 10 of the vehicle body 2.

Figure 11:
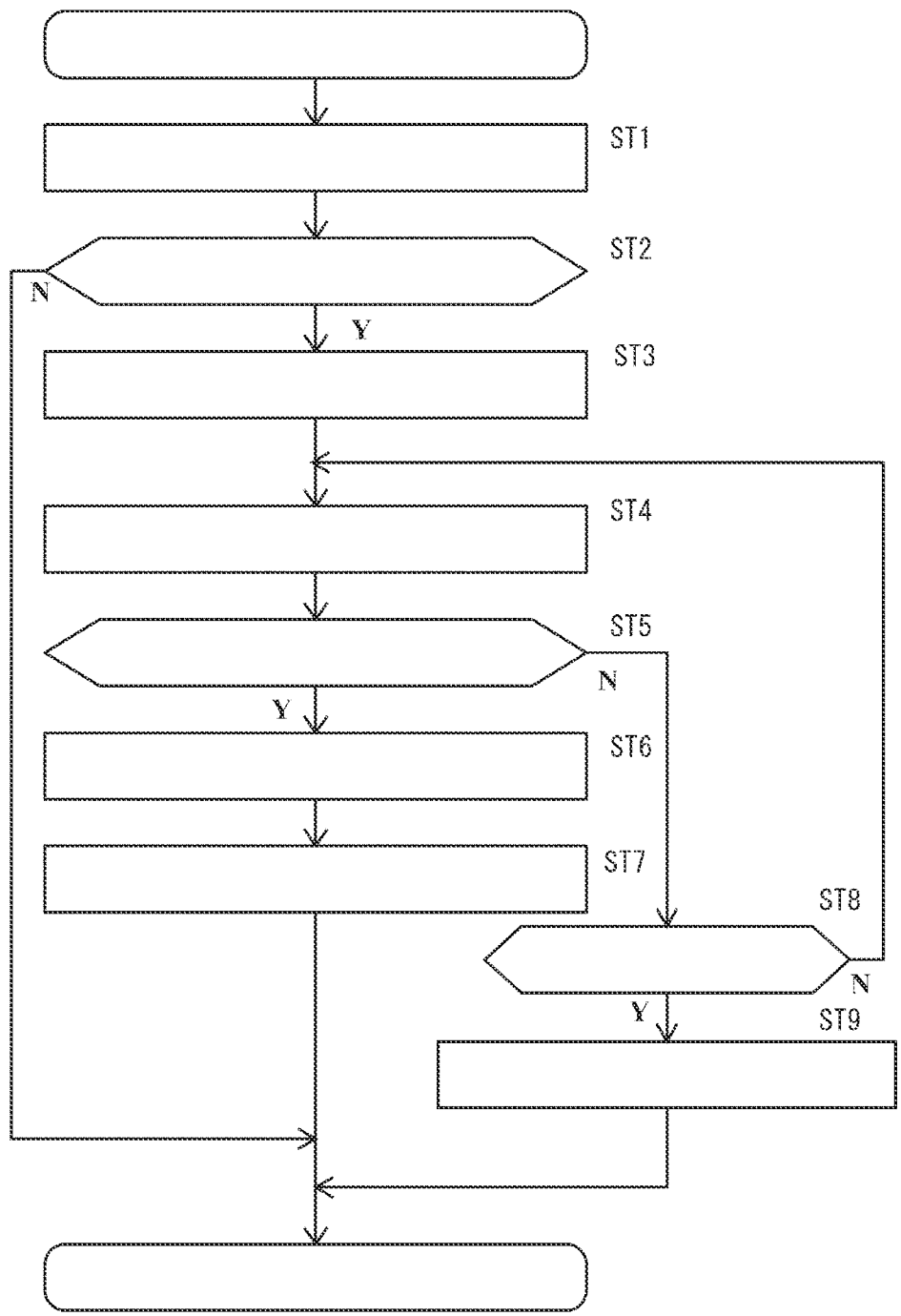
FIG. 11 is a flowchart of side collision occupant protection control executed by a CPU illustrated in FIG. 5 serving as a controller.

FIG. 11 is a flowchart of side collision occupant protection control executed by the CPU 47 illustrated in FIG. 5 serving as the controller.

The CPU 47 illustrated in FIG. 5 may repeatedly execute the side collision occupant protection control illustrated in FIG. 11, when an occupant is on the automobile 1 for example.

In step ST1, the CPU 47 acquires information from each part of the automobile 1. The information thus acquired at least includes a captured image obtained by the external camera 41.

In step ST2, the CPU 47 determines the risk of side collision, as side collision prediction. When the captured image obtained by the external camera 41 is acquired in step ST1, it suffices if the CPU 47 determines whether the captured image obtained by the external camera 41 includes the other automobile 4 or the like that may make side collision on the host vehicle. When there is no other automobile 4 or the like that may make side collision on the host vehicle, the CPU 47 ends the control. When there is the other automobile 4 or the like that may make side collision on the host vehicle, the CPU 47 advances the processing to step ST3.

In step ST3, the CPU 47 operates the pushing mechanism 48, to move the movable body 62 of the pushing mechanism 48 to the deployed position. Thus, the CPU 47 serving as the controller can reversibly operate the movable body 62 of the pushing mechanism 48 toward the occupant seated on the seat 15, when the risk of the side collision made on the automobile 1 is detected by the external camera 41, which is an in-vehicle sensor.

In step ST4, the CPU 47 acquires the latest information from each part of the automobile 1. The information thus acquired at least includes a detection values obtained by the acceleration sensor 42 and a captured image obtained by the external camera 41.

In step ST5, the CPU 47 determines whether the side collision has been detected. When the detection value obtained by the acceleration sensor 42 is acquired in step ST4, the CPU 47 determines whether the detection value in the vehicle width direction W obtained by the acceleration sensor 42 is equal to or larger than a threshold for the determination on the side collision. When the detection value in the vehicle width direction W obtained by the acceleration sensor 42 is equal to or larger than the threshold for the determination on the side collision, the CPU 47 determines that the side collision has been detected, and advances the processing to step ST6. When the detection value in the vehicle width direction W obtained by the acceleration sensor 42 is not equal to or larger than the threshold for the determination on the side collision, the CPU 47 determines that the side collision has not been detected, and advances the processing to step ST8.

In step ST6, the CPU 47 operates the pushing mechanism 48, to deploy the bag body 63 of the pushing mechanism 48. Thus, the CPU 47 serving as the controller can operate the pushing mechanism 48 to deploy the bag body 63, when the acceleration sensor 42, which is an in-vehicle sensor, detects the side collision to be made on the automobile 1.

In step ST7, the CPU 47 operates the push up mechanism 49. As a result, the outer side part of the seat surface of the seat 15 on which the occupant is seated in the vehicle width direction W of the automobile 1 is pushed up relative to the inner side part of the seat surface. Thus, the CPU 47 serving as the controller can operate both the pushing mechanism 48 and the push up mechanism 49, when the acceleration sensor 42, which is an in-vehicle sensor detects the risk of the side collision made on the automobile 1. The CPU 47 can operate the push up mechanism 49 after operating the pushing mechanism 48 to deploy the bag body 63.

It takes a certain amount of time for the bag body 63 of the pushing mechanism 48 started to be deployed in step ST6 to push the occupant seated on the seat 15 until his or her posture is collapsed inward from the ignition signal is output to the inflator 64. In view of this, in the embodiment, the CPU 47 operates the push up mechanism 49 to push up the seat part 16 of the seat 15 in step ST7, after the control to start the deployment of the bag body 63 of the pushing mechanism 48 in step ST6. Thus, the outer side part of the seat part 16 of the seat 15 can be pushed up high, with the posture of the occupant seated on the seat 15 collapsed inward.

Still, the timings of these operations are in a delicate relationship. When the outer side part of the seat part 16 of the seat 15 is pushed up high before the posture of the occupant seated on the seat 15 has started to collapse to be tilted inward, the upper body of the occupant is more likely not to tilt inward. On the other hand, the interval between the timings of these operations is difficult to set sufficiently long, to make the upper body of the occupant collapsed to tilt inward as the preparation against the side collision. For the preparation against the side collision, the upper body of the occupant tilts inward as quickly as possible.

In view of this, the CPU 47 may make the timer 44 measure the elapsed time after the execution of the processing in step ST6, and make the push up mechanism 49 start pushing up the seat part 16 of the seat 15 in step ST7, when the timer 44 measures a predetermined threshold period, for example.

Then, the CPU 47 ends the control.

In step ST8, the CPU 47 determines whether the side collision has been avoided. When the captured image obtained by the external camera 41 is acquired in step ST4, it suffices if the CPU 47 determines whether the captured image obtained by the external camera 41 indicates the risk of the side collision by the other automobile 4 on the host vehicle still remains. When the risk of the side collision by the other automobile 4 still remains, the driver performs a deceleration/stopping operation on the automobile 1, which is the host vehicle, or an operation to steer clear of the other automobile 4, for example. The other automobile 4 may also decelerate/stop, or change the route to steer clear of the automobile 1, which is the host vehicle. When such steering or traveling has been performed, the automobile 1, which is the host vehicle, can be prevented from making side collision on the other automobile 4. Such a change in situation may be captured in the captured image obtained by the external Camera 41. When the risk of side collision on the host vehicle remains, the CPU 47 returns the processing to step ST4. The CPU 47 repeats the processing in step ST4, step ST5, and step ST8, until the side collision is determined to be avoidable in step ST8. When there is no longer a risk of side collision on the host vehicle, the CPU 47 advances the processing to step ST9.

In step ST9, the CPU 47 operates the pushing mechanism 48, to return the movable body 62 to the position under the normal state. As a result, the automobile 1 with no risk of side collision can continue traveling.

Then, the CPU 47 ends the control.

Figure 12:
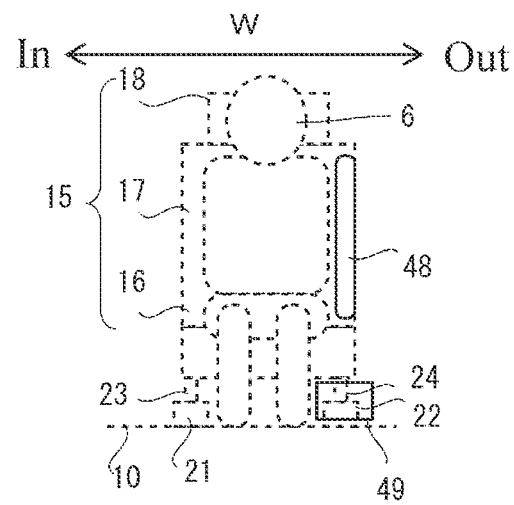
FIG. 12 is a diagram schematically illustrating a seat in a state before side collision control.
Figure 13:
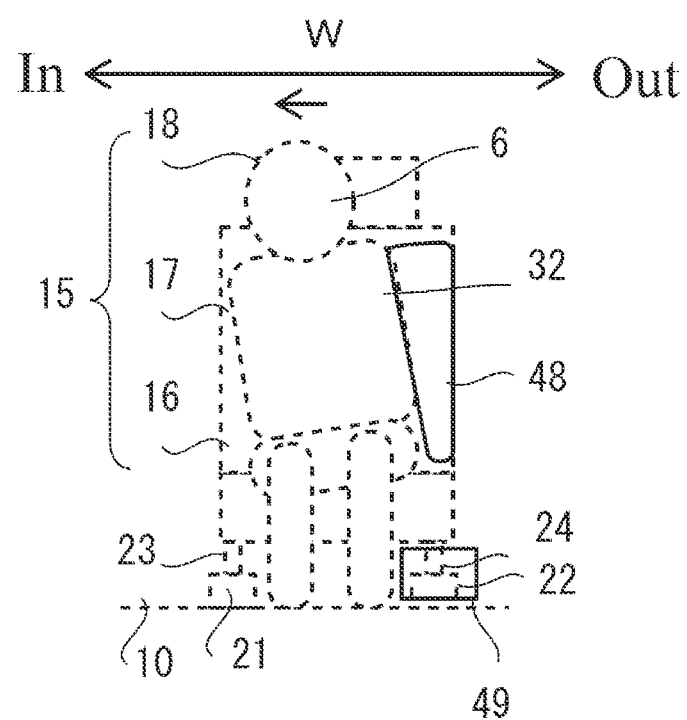
FIG. 13 is a diagram schematically illustrating the seat in a state after the side collision prediction.
Figure 14:
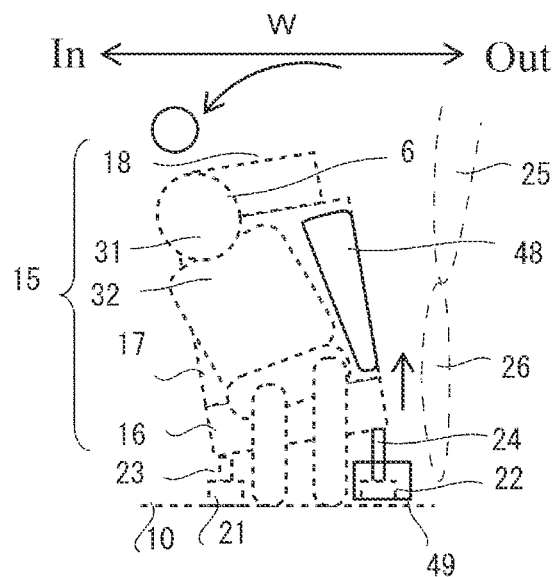
FIG. 14 is a diagram schematically illustrating the seat after side collision detection.

FIG. 12 is a diagram schematically illustrating the seat 15 in a state before the side collision control. FIG. 13 is a diagram schematically illustrating the seat 15 in a state after the side collision prediction. FIG. 14 is a diagram schematically illustrating the seat 15 after side collision detection.

Before the CPU 47 predicts the side collision in step ST2 in FIG. 11 and moves the movable body 62 to the deployed position in step ST3, the seat 15 is in a state illustrated in FIG. 12.

Then, when the CPU 47 moves the movable body 62 of the pushing mechanism 48 to the deployed position in step ST3 and deploys the bag body 63 of the pushing mechanism 48 in step ST6, the seat 15 transitions to a state illustrated in FIG. 13. The upper body of the occupant 6 seated on the seat 15 as a whole is pushed inward in the vehicle width direction W, to be inclined inward as a whole.

Then, when the CPU 47 operates the push up mechanism 49 in step ST7, the seat 15 transitions to a state illustrated in FIG. 14. With the outer side part of the seat surface of the seat 15 in the vehicle width direction W pushed up relative to the inner side part, the upper body of the occupant 6 inclined inward as a whole may move to tilt inward as a whole as indicated by a solid line arrow in FIG. 14.

As a result, the upper body of the occupant 6 as a whole may move away from the left side surface part 3 onto which the other automobile 4 collides. The upper body of the occupant 6 is away from the left side surface part 3 onto which the other automobile 4 collides, so as to be less likely to be affected by the side collision. With the occupant 6 smoothly moved inward during the side collision, an impact of the side collision on the occupant 6 can be reduced.

The occupant 6 seated on the seat 15 him or herself basically attempts to move away from the left side surface part 3 in response to the side collision, and thus would not feel uncomfortable by such an inward movement. The occupant 6 can be away from the left side surface part 3 as he or she desires.

Although not elaborated in the drawings, the occupant 6 seated on the seat 15 usually wears a three-point seatbelt. Also in this case, the upper body of the occupant 6 as a whole can be away from the left side surface part 3 as the occupant 6 desires.

The pushing mechanism 48 includes the multiple pushing modules 51 to 53 as illustrated in FIG. 5. The multiple pushing modules 51 to 53 deploy their bag bodies 63. The multiple bag bodies 63 are deployed in a shape with a contour that is inclined and flush as a whole as illustrated in FIG. 13 and FIG. 14. With this configuration, the outer side part of the upper body of the occupant 6 as a whole is pushed by the multiple bag bodies 63, and thus the upper body pushed inward is less likely to bend in the vehicle width direction W when tilting.

Figure 15:
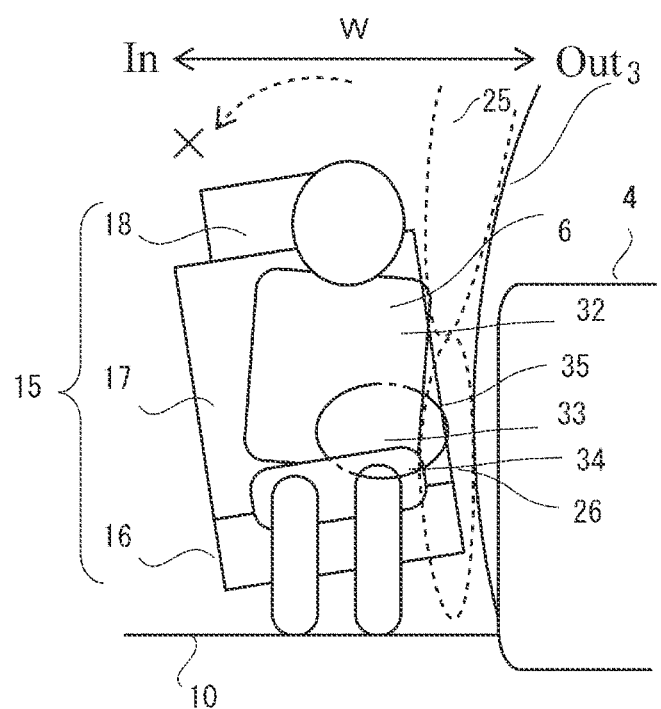
FIG. 15 is a diagram illustrating the seat in a state after the side collision detection, in a comparative example where only the push up mechanism is operated.

FIG. 15 is a diagram schematically illustrating the seat 15 in a state after the side collision detection, in comparative example where only the push up mechanism 49 is operated.

When the push up mechanism 49 provided to the seat surface of the seat 15 is operated without pushing the shoulder 32 and the like of the occupant 6 seated on the seat 15 inward in advance by the pushing mechanism 48, the upper body of the occupant 6 is likely to bend in the vehicle width direction W as illustrated in FIG. 15.

Furthermore, the occupant 6 seated on the seat surface of the seat 15 does not have a rigid body as a whole, like known dummy dolls. For example, basically, only the spine exists in the abdomen 33 of a person. The abdomen 33 is likely to bend in the vehicle width direction W.

When such a human body skeleton is assumed, simply pushing up the outer side part of the seat surface of the seat 15 only results in the pushing up of the outer side part of the pelvis 34 of the occupant 6 seated on the seat 15. As indicated by a dashed line arrow in the drawing, the upper body of the occupant 6 is less likely to tilt inward. The shoulder 32 and the head 31 above the pelvis 34 of the occupant seated on the seat 15 are less likely to be pushed up together with the pelvis 34. In response to the pushing up of the outer side part of the pelvis 34, the shoulder 32 and the head 31 of the occupant 6 seated on the seat 15 would maintain the original positions by means of gravity and inertial force that has been applied.

As a result, the occupant 6 seated on the seat 15 the outer side part of the seat surface of which is pushed up might have an outer side part 35 of the abdomen 33, which is between the pelvis 34 pushed up and the shoulder 32 not moving, bending and compressed as illustrated in FIG. 15. When the impact of the side collision is further received in a state with such a compression, the outer side part 35 of the abdomen 33 of the occupant seated on the seat 15 already compressed may be further compressed.

As described above, in the embodiment, the push up mechanism 49 that can push up the outer side part of the seat surface of the seat 15 on which the occupant is seated, in the vehicle width direction W of the automobile 1, relative to the inner side part of the seat surface, and the pushing mechanism 48 that can push at least the shoulder 32 of the occupant seated on the seat 15 from the outer side toward the inner side in the vehicle width direction W are provided.

The CPU 47 serving as the controller operates both the push up mechanism 49 and the pushing mechanism 48, when the in-vehicle sensor detects the side collision to be made on or the risk of the side collision side made on the automobile 1. For example, the CPU 47 operates the push up mechanism 49 after operating the pushing mechanism 48.

Thus, when the side collision on the automobile 1 occurs, the occupant seated on the seat 15 has the outer side part of the pelvis 34 pushed up by the push up mechanism 49 relative to the inner side part, while having at least the shoulder 32 pushed inward in the vehicle width direction W by the pushing mechanism 48 to have the inwardly collapsed posture. The occupant on the seat 15 with the inwardly collapsed posture may have the upper body above the pelvis 34 tilting as a whole inward in the vehicle width direction W. The upper body above the pelvis 34 of the occupant entirely tilts inward in the vehicle width direction W as a whole when the side collision occurs, and thus is less likely to largely bend in the vehicle width direction W. The occupant seated on the seat 15 can have the upper body tilted inward as a whole, so as not to have the abdomen 33 compressed. The local compression of the upper body of the occupant above the pelvis 34, which may occur when the upper body largely bends in the vehicle width direction W in response to the side collision, is less likely to occur.

As a result, with the embodiment, even when the side collision occurs, the occupant seated on the seat 15 is less likely to be directly affected by the side collision. Furthermore, the upper body as a whole favorably tilts inward, whereby the local compression in the upper body is less likely to occur. With the embodiment, improvement in the occupant protection performance against side collision can be expected. With the embodiment, the compression of the abdomen 33 of the occupant due to the side collision is effectively reduced to protect the organs in the abdomen 33. Furthermore, the upper body of the occupant is smoothly swayed inward with the seated posture maintained, so that the impact of the side collision can be effectively reduced. With the embodiment, the occupant protection function can be improved.

Second Embodiment

Next, a second embodiment of the disclosure will be described. Differences from the embodiment described above will be mainly described below. Configurations that are the same as those in the embodiment described above will be denoted by the same reference signs, and the description thereof will be omitted.

Figure 16:
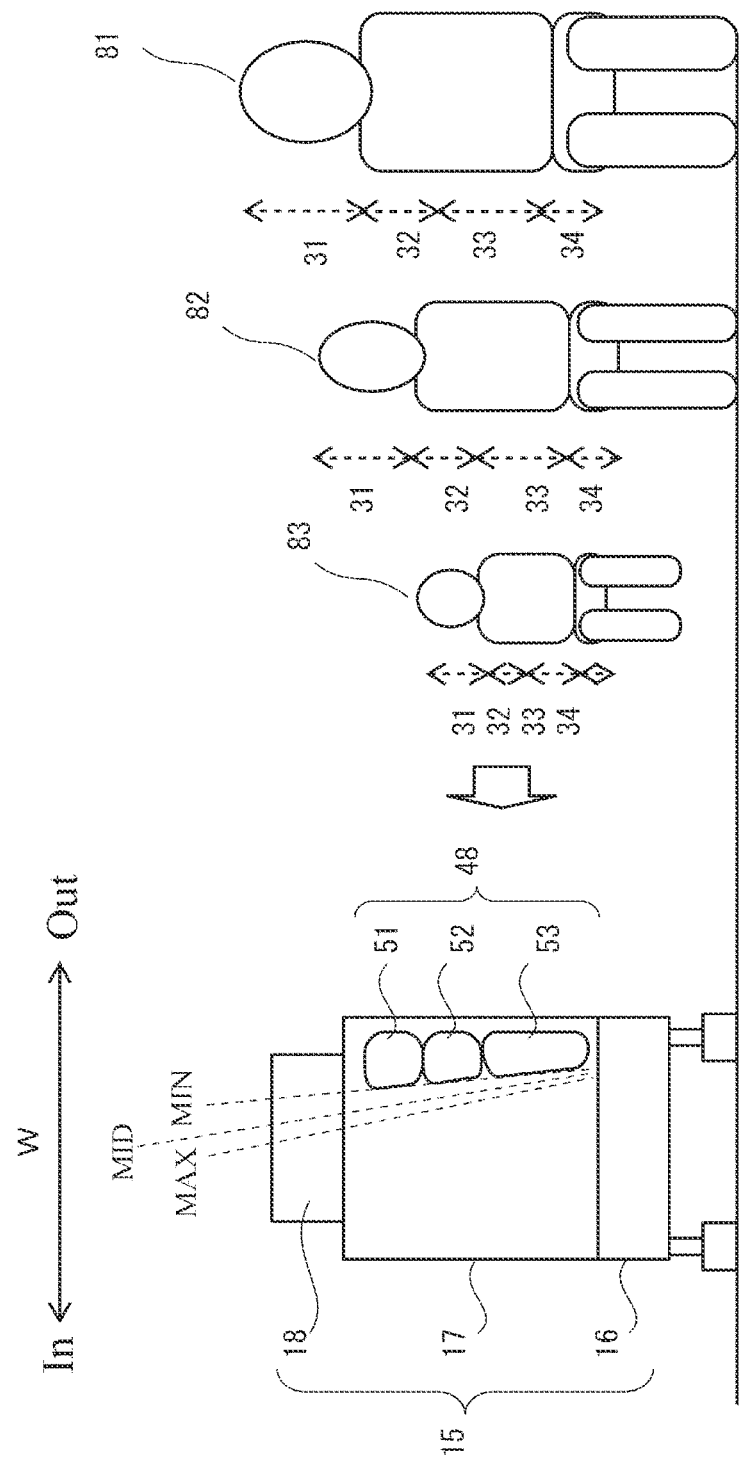
FIG. 16 is a diagram illustrating a seat and multiple types of occupants that can be seated on the seat.

FIG. 16 is a diagram illustrating the seat 15 and multiple types of occupants that can be seated on the seat.

As illustrated as an example in FIG. 16, an adult male 81 with a large body size, a child 83 with a small body size, an adult female 82 with an intermediate body size between them, or the like can be seated on the seat 15 of the automobile 1.

As can be understood from the side by side arrangement in the figure, the height from the seat surface to the shoulder 32, for example, of the adult male 81 seated on the seat 15 is different from those of the adult female 82 and the child 83 seated. The height also differs between the adult female 82 and the child 83.

As described in the above embodiment, the pushing mechanism 48 is to implement the pushing to push the upper body of the occupant seated on the seat 15 as a whole.

On the other hand, the head 31 of the occupant seated on the seat 15 is desirably not pushed. When the head 31 of the occupant is directly pushed, the occupant may feel burdened on the neck.

The height position of the shoulder 32 of the adult male 81 seated on the seat 15 may be equivalent to the height position of the head 31 of the adult female 82 or the height position of the head 31 of the child seated.

The height position of the shoulder 32 of the adult female 82 seated on the seat 15 may be equivalent to the height position of the head 31 of the child seated.

In view of this, in the embodiment, a setting is made to switch among the multiple pushing modules 51 to 53 of the pushing mechanism 48, to select the operating module(s) in accordance with the body size of the occupant seated on the seat 15.

For the multiple pushing modules 51 to 53 of the pushing mechanism 48, respective installation heights are determined to correspond to these different body sizes.

For example, the upper end of the lower-stage pushing module 53 is set to correspond to the height of the shoulder 32 of the child 83 seated on the seat 15. Such a lower-stage pushing module 53 can push the upper body of the child 83 seated on the seat 15 as a whole.

The lower end of the middle-stage pushing module 52 is positioned above the upper end of the lower-stage pushing module 53. The upper end of the middle-stage pushing module 52 is set to correspond to the height of the shoulder 32 of the adult female 82 seated on the seat 15. Such a middle-stage pushing module 52 can operate together with the lower-stage pushing module 53 to push the upper body of the adult female 82 seated on the seat 15 as a whole.

The lower end of the upper-stage pushing module 51 is positioned above the upper end of the middle-stage pushing module 52. The upper end of the upper-stage pushing module 51 is set to correspond to the height of the shoulder 32 of the adult male 81 seated on the seat 15. Such an upper-stage pushing module 51 can operate together with the lower-stage pushing module 53 and the middle-stage pushing module 52 to push the upper body of the adult male 81 seated on the seat 15 as a whole.

The pushing amount of the inward pushing for the occupant seated on the seat 15 is expected to be changed in accordance with the body size of the occupant or the like, as indicated by a dashed line overlapping the seat 15 in the figure.

For example, when the adult male 81 is seated on the seat 15, strong, large, and maximum pushing is to be performed since the weight is heavy. The adult male 81 has a long shoulder width.

When the child 83 is seated on the seat 15, soft and minimum required pushing is to be performed since the weight is light. The child 83 has a short shoulder width.

When the adult female 82 is seated on the seat 15, medium pushing with medium force is to be performed. The adult female 82 has an intermediate shoulder width.

Under these assumptions, when the adult male 81 is seated on the seat 15, the multiple bag bodies 63 of the pushing mechanism is expected to be deployed to a position indicated by the innermost one of three dashed lines that indicates the maximum position (MAX), with strong force. Thus, the lower-stage pushing module 53 of the pushing mechanism 48 operates to make the movable body 62 move and the bag body 63 deployed to reach the dashed line indicating the maximum position (MAX). The middle-stage pushing module 52 operates to make the movable body 62 move and the bag body 63 deployed to reach the dashed line indicating the maximum position (MAX). The upper-stage pushing module 51 operates to make the movable body 62 move and the bag body 63 deployed to reach the dashed line indicating the maximum position (MAX). The pushing mechanism 48 forms a support plane along the dashed line indicating the maximum position (MAX), by deploying the three bag bodies 63 in different shapes from the multiple pushing modules 51 to 53. The three bag bodies 63 deployed in different shapes may be deployed to achieve a shape of the pushing mechanism 48 as illustrated in FIG. 13.

Thus, with the long support plane from the upper stage to the lower stage, the upper body of the adult male 81 seated on the seat 15 can be pushed and inclined inward by the pushing mechanism 48. Only a part of the adult male 81 at and below his shoulders is pushed inward.

When the adult female 82 is seated on the seat 15, the multiple bag bodies 63 of the pushing mechanism is expected to be deployed to a position indicated by the middle one of the three dashed lines that indicates the middle position (MID), with medium force. Thus, the lower-stage pushing module 53 of the pushing mechanism 48 operates to make the movable body 62 move and the bag body 63 deployed to reach the dashed line indicating the middle position (MID). The middle-stage pushing module 52 operates to make the movable body 62 move and the bag body 63 deployed to reach the dashed line indicating the middle position (MID). The upper-stage pushing module 51 does not operate. The pushing mechanism 48 forms a support plane along the dashed line indicating the middle position (MID), by deploying the two bag bodies 63 in different shapes from the multiple pushing modules 52 and 53. The two bag bodies 63 deployed in different shapes may be deployed to achieve a shape of the pushing mechanism 48 similar to that illustrated in FIG. 13.

Thus, with the middle support plane from the middle stage to the lower stage, the upper body of the adult female 82 seated on the seat 15 can be pushed and inclined inward by the pushing mechanism 48. Only a part of the adult female 82 at and below her shoulders is pushed inward, Since the side support part 19 is provided while being divided into the upper part 191, the middle part 192, and the lower part 193, the side support part 19 is less likely to hit the head of the adult female 82.

When the child 83 is seated on the seat 15, the multiple bag bodies 63 of the pushing mechanism is expected to be deployed to a position indicated by the outermost one of the three dashed lines that indicates the minimum position (MIN), with small force, Thus, the lower-stage pushing module 53 of the pushing mechanism 48 operates to make the movable body 62 move and the bag body 63 deployed to reach the dashed line indicating the minimum position (MIN). The middle-stage pushing module 52 and the upper-stage pushing module 51 do not operate. The pushing mechanism 48 forms a support plane along the dashed line indicating the minimum position (MIN), by deploying one bag body 63 in different shapes from the lower-stage pushing module 53. With the short support plane at the lower stage, the upper body of the child 83 seated on the seat 15 can be pushed and inclined inward by the pushing mechanism 48. The one bag body 63 deployed in different shapes may be deployed to achieve a shape of the pushing mechanism 48 similar to that illustrated in FIG. 13.

Only a part of the child 83 at and below his or her shoulders is pushed inward. Since the side support part 19 is provided while being divided into the upper part 191, the middle part 192, and the lower part 193, the side support part 19 is less likely to hit the head of the child 83, FIG. 17 is a flowchart illustrating operation setting control for the side collision, executed by a controller of the automobile 1 according to the second embodiment of the disclosure.

Figure 17:
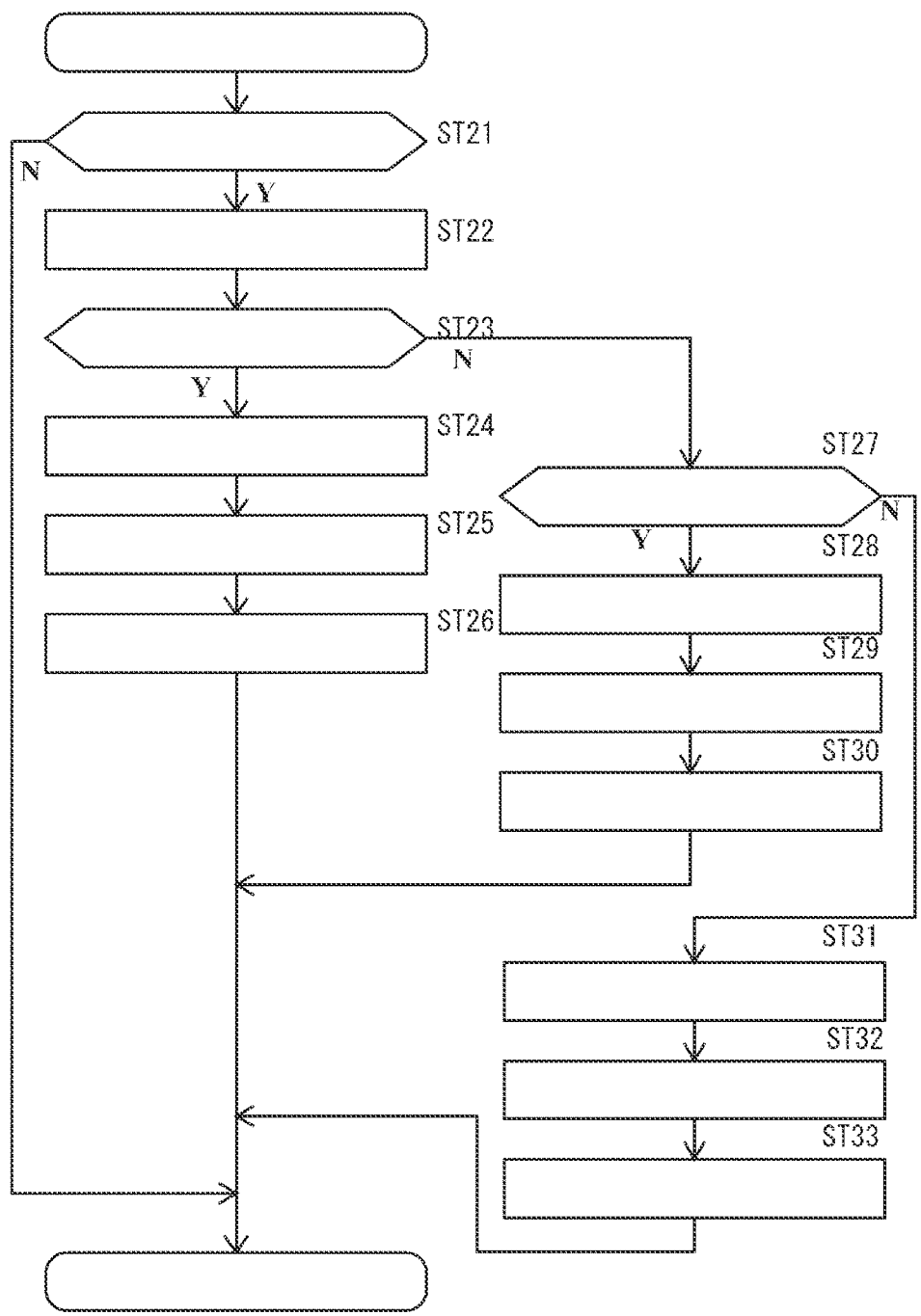
FIG. 17 is a flowchart illustrating operation setting control for the side collision, executed by a controller of an automobile according to an embodiment of the disclosure.

The CPU 47 illustrated in FIG. 5 may repeatedly perform the operation setting control illustrated in FIG. 17. The CPU 47 may repeatedly execute the operating setting control illustrated in FIG. 17, each time a new occupant gets on the automobile 1 for example.

In step ST21, the CPU 47 determines whether a new occupant has gotten on the automobile 1. The CPU 47 may acquire a captured image obtained by the external camera 41, a detection value from the seat occupancy sensor 43, and the like, and determine whether a new occupant has gotten on the automobile 1, based on a change in these types of information caused by the occupant getting on. When there is no new occupant on the automobile 1, the CPU 47 ends the control. When there is a new occupant on the automobile 1, the CPU 47 advances the processing to step ST22.

In step ST22, the CPU 47 acquires body size information of the new occupant. The CPU 47 may acquire the captured image obtained by the external camera 41, the detection value from the seat occupancy sensor 43, and the like, as the body size information of the new occupant.

In step ST23, the CPU 47 determines whether the new occupant has a body size of the adult male 81. The CPU 47 may compare the size of the occupant in the captured image obtained by the external camera 41 and the detection value of the seat occupancy sensor 43 with corresponding thresholds set for the adult male 81, to determine whether the new occupant has a body size of the adult male 81. When the body size is determined to be that of the adult male 81, the CPU 47 advances the processing to step ST24. When the body size is determined not to be that of the adult male 81, the CPU 47 advances the processing to step ST27.

In step ST24, the CPU 47 activates the setting for operating all of the multiple modules of the pushing mechanism 48, for pushing the adult male 81.

In step ST25, the CPU 47 activates the setting for deploying the multiple bag bodies 63 of the pushing mechanism 48 with the maximum deployment amount, for pushing the adult male 81.

In step ST26, the CPU 47 activates the setting for setting the amount of pushing by the push up mechanism 49 for the outer side part of the seat part 16 of the seat 15 to maximum in FIG. 10, to push the adult male 81.

Then, the CPU 47 ends the control.

In step ST27, the CPU 47 determines whether the new occupant has a body size of the adult female 82. The CPU 47 may compare the size of the occupant in the captured image obtained by the external camera 41 and the detection value of the seat occupancy sensor 43 with corresponding thresholds set for the adult female 82, to determine whether the new occupant has a body size of the adult female 82. When the body size is determined to be that of the adult female 82, the CPU 47 advances the processing to step ST28. When the body size is determined not to be that of the adult female 82 and thus is of the child 83, the CPU 47 advances the processing to step ST31.

In step ST28, the CPU 47 activates the setting for operating only the middle-stage and the lower-stage modules of the multiple modules of the pushing mechanism 48, for pushing the adult female 82.

In step ST29, the CPU 47 activates the setting for deploying the multiple bag bodies 63 of the pushing mechanism 48 with the medium deployment amount, for pushing the adult female 82.

In step ST30, the CPU 47 activates the setting for setting the amount of pushing by the push up mechanism 49 for the outer side part of the seat part 16 of the seat 15 to medium in FIG. 10, to push the adult female 82.

Then, the CPU 47 ends the control.

In step ST31, the CPU 47 activates the setting for operating only the lower-stage one of the multiple modules of the pushing mechanism 48, for pushing the child 83.

In step ST32, the CPU 47 activates the setting for deploying the multiple bag bodies 63 of the pushing mechanism 48 with the minimum deployment amount, for pushing the child 83.

In step ST33, the CPU 47 activates the setting for setting the amount of pushing by the push up mechanism 49 for the outer side part of the seat part 16 of the seat 15 to minimum in FIG. 10, to push the child 83.

Then, the CPU 47 ends the control.

Such setting information may be recorded in the memory 50.

The CPU 47 reads the setting information from the memory 50 when operating the pushing mechanism 48 and the push up mechanism 49 under the side collision occupant protection control illustrated in FIG. 11, and operates the pushing mechanism 48 and the push up mechanism 49 based on the setting recorded in the memory 50.

As described above, in the embodiment, the CPU 47 serves as the controller and determines the body size of the occupant seated on the seat 15, based on the captured image obtained by the external camera 41 serving as the occupant sensor, the detection value from the seat occupancy sensor 43, and the like. Based on the body size thus determined, the CPU 47 controls the operation of the multiple pushing modules 51 to 53 of the pushing mechanism 48, and the operation of the push up mechanism 49. For example, when the body size determined is small like that of the child 83, the CPU 47 regulates the operations of the multiple pushing modules 51 to 53 compared with a case of the large body size such as that of the adult male 81, to prevent operate the pushing module above the shoulder 32 of the occupant seated on the seat 15 from operating.

Thus, for example, when the adult female 82 or the child 83 is seated on the seat 15, some of the pushing modules of the pushing mechanism 48 corresponding to the head 31 of such occupants can be prevented from being operated. The CPU 47 can push the upper body of the adult female 82 or the child 83 seated on the seat 15 inward with appropriate strength and by an appropriate pushing amount as with the adult male 81 being seated, while reducing the impact on the neck of such occupants. The CPU 47 can appropriately incline the seat 15 to a height corresponding to the body size.

Also for the adult female 82 or the child 83 seated on the seat 15, their upper body as a whole is inclined inward, so that the organs in the abdomen 33 can be favorably protected with the bending of the upper body in the vehicle width direction W reduced.

For example, in the embodiment, one(s) of the three pushing modules 51 to 53, respectively provided for the upper part 191, the middle part 192, and the lower part 193 of the side support part 19, that may hit the head of the adult female 82 or the head of the child 83 is not operated. With the height of the operation range of the pushing mechanism 48 thus changed in accordance with the body shape of the occupant, the adult female 82 and the child 83 are less likely to be burdened.

In the embodiment, the bag bodies 63 of the three pushing modules 51 to 53 of the pushing mechanism 48 deploy in different shapes to form one support plane. Thus, the multiple bag bodies 63 of the pushing mechanism 48 can favorably support the entire upper body of each of multiple occupants with different body shapes.

The embodiment described above is an example of an embodiment of the disclosure, Thus, the disclosure is not limited to this, and can be modified and changed in various ways without departing from the gist of the disclosure.

For example, in the above embodiment, the passenger seat 12 is described as an example of the seat 15, and the case where the pushing mechanism 48 and the push up mechanism 49 are provided is described.

Alternatively, the pushing mechanism 48 and the push up mechanism 49 may also be provided to the driver's seat 11 and the back seat 13 in FIG. 1, for example.

The pushing mechanism 48 and the push up mechanism 49 provided to the driver's seat 11 are provided on the opposite side in the vehicle width direction W compared with the case of the passenger seat 12 as illustrated in FIG. 4.

A bench seat on which multiple occupants can be seated may be employed as the back seat 13. In this case, multiple sets of the pushing mechanism 48 and the push up mechanism 49 may be provided at respective seated positions of the bench seat on which each occupant is seated.

When the bench seat is used, the seat part 16 and the back part 17 may be separately provided to the vehicle body 2. In this case, the push up mechanism 49 may only push up the seat part 16 of the bench seat at each seated position.

In the embodiment described above, the pushing mechanism 48 includes the three pushing modules 51 to 53. The side support part 19 is divided into the upper part 191, the middle part 192, and the lower part 193 to correspond to the respective pushing modules, as illustrated in FIG. 5 and FIG. 6.

Alternatively, for example, the pushing modules of the pushing mechanism 48 and the sections of the side support part 19 may be provided in two sets or four or more sets.

The side support part 19 may be divided into sections less than the pushing modules. Alternatively, the side support part 19 may be divided along the vertical direction. In this case, the multiple pushing modules are provided to each of the divided sections of the side support part 19. The urethane material 68 provided in the side support part 19 may be divided by the number of the pushing modules. A cover defining the surface design of the side support part 19 may be formed by an elastic cloth material. With this configuration, only part of the multiple pushing modules is operated, so that the collapsing performance as in the above embodiment can be expected. Still, the side support part 19 is divided into sections corresponding one-to-one to the respective pushing modules. In this case, the side support part 19 can favorably correspond to the operation of the pushing modules.

The occupant protection device for a vehicle of the disclosure includes the push up mechanism that can push up the outer side part of the seat surface of the seat on which the occupant is seated, in the vehicle width direction, relative to the inner side part of the seat surface, and the pushing mechanism that can push at least the shoulder of the occupant seated on the seat from the outer side toward the inner side in the vehicle width direction. The controller operates both the push up mechanism and the pushing mechanism, when the in-vehicle sensor detects the side collision to be made on or the risk of the side collision side made on the vehicle.

Thus, when the side collision on the vehicle occurs, the occupant seated on the seat has the outer side part of the pelvis pushed up by the push up mechanism relative to the inner side part, while having at least the shoulder pushed inward in the vehicle width direction by the pushing mechanism to have the inwardly collapsed posture. The occupant on the seat with the inwardly tilted posture may have the upper body above the pelvis collapsing as a whole inward in the vehicle width direction. Thus, the occupant can be moved away from the part of the automobile subjected to the side collision.

In addition, in the disclosure, the upper body above the pelvis of the occupant entirely tilts inward in the vehicle width direction as a whole when the side collision occurs. With the upper body as a whole entirely pushed and tilted inward, the upper body of the occupant is less likely to largely bend in the vehicle width direction. The occupant seated on the seat is less likely to suffer the compression of the abdomen due to his or her upper body bending in the vehicle width direction.

As a result, with the disclosure, the occupant seated on the seat is moved away from the part subjected to the side collision to be less likely to be directly affected by the side collision, and the upper body of the occupant as a whole is pushed inward. Thus, the upper body as a whole favorably tilts inward, whereby the risk of the local compression in the abdomen or the like of the upper body can be reduced. With the disclosure, improvement in the occupant protection performance against side collision can be expected.

The invention claimed is:

1. An occupant protection device for a vehicle, the vehicle including a seat on which an occupant is to be seated, the occupant protection device comprising:
   a push up mechanism configured to push up an outer side part of a seat surface of the seat, in a vehicle width direction of the vehicle, relative to an inner side part of the seat surface;
   a pushing mechanism configured to push at least a shoulder of the occupant seated on the seat from an outer side toward an inner side in the vehicle width direction, the pushing mechanism including:
      a movable body that is provided along an edge of a back part of the seat on the outer side in the vehicle width direction, and is movable between a first position and a second position located on the inner side of the first position; and
      a bag body deployable on a side of the occupant of the movable body;
   a first sensor configured to detect a risk of a side collision to be made on the vehicle;
   a second sensor configured to detect an acceleration of the vehicle; and
   a controller configured to;
      in response to detecting of the risk of the side collision, (1) control the pushing mechanism to move the movable body to the second position from the first position, and (2) determine whether the side collision has been detected based on the acceleration of the vehicle;
      in response to determining that the side collision has been detected, (1) control the pushing mechanism to deploy the bag body and (2) control the push up mechanism to push up the outer side part of the seat surface relative to the inner side part of the seat surface after a predetermined time has elapsed from controlling the pushing mechanism to deploy the bag body; and
      in response to determining that the side collision has not been detected, control the pushing mechanism to move the movable body to the first position from the second position.

2. The occupant protection device for the vehicle according to claim 1, wherein the push up mechanism includes an actuator configured to push up the outer side part of the seat surface of the seat, in the vehicle width direction of the vehicle, relative to the inner side part of the seat part, and
   wherein the controller is further configured to operate the actuator, in controlling of the push up mechanism to push up the outer side part of the seat surface relative to the inner side part of the seat surface.

3. The occupant protection device for the vehicle according to claim 2, further comprising an occupant sensor configured to perform a detection of a body size of the occupant seated on the seat, wherein the pushing mechanism comprises pushing modules, the pushing modules each comprising the movable body and the bag body, the pushing modules being disposed along an edge of a back part of the seat on the outer side in the vehicle width direction, and wherein the controller is further configured to:
determine the body size of the occupant seated on the seat based on the detection by the occupant sensor; and
control an operation of the pushing modules of the pushing mechanism based on the body size determined, to prevent one or more of the pushing modules above the shoulder of the occupant seated on the seat from operating.

4. The occupant protection device for the vehicle according to claim 1, wherein the pushing mechanism contacts and pushes the shoulder of the occupant seated on the seat such that the occupant is rotated relative to the seat surface.

5. The occupant protection device for the vehicle according to claim 1, wherein the pushing mechanism pushes and rotates an entirety of an upper body of the occupant relative to the seat surface.

6. The occupant protection device for the vehicle according to claim 1, wherein the push up mechanism pushes up the outer side part of the seat surface such that the seat surface is rotated relative to a rotation of the occupant as a result of the pushing from the pushing mechanism.

7. The occupant protection device for the vehicle according to claim 1, wherein pushing mechanism pushes the occupant at a predetermined rate.

8. An occupant protection system for a vehicle, the vehicle including:

a seat on which an occupant is to be seated;
a push up mechanism configured to push up an outer side part of a seat surface of the seat, in a vehicle width direction of the vehicle, relative to an inner side part of the seat surface;
a movable body provided along an edge of a back part of the seat on an outer side in the vehicle width direction, and configured to move between a first position and a second position located on an inner side of the first position in the vehicle width direction; and
a bag body deployable on a side of the occupant of the movable body;
a first sensor configured to detect a risk of side collision to be made on the vehicle; and
a second sensor configured to detect an acceleration of the vehicle,
the occupant protection system comprising:
a processor; and
a memory, the memory storing instructions to cause the processor to:
in response to detecting of the risk of the side collision, (1) control the movable body to move to the second position from the first position, and (2) determine whether the side collision has been detected based on the acceleration of the vehicle;
in response to determining that the side collision has been detected, (1) control the bag body such that the bag body deploys and (2) control the push up mechanism to push up the outer side part of the seat surface relative to the inner side part of the seat surface after a predetermined time has elapsed from controlling the bag body; and
in response to determining that the side collision has not been detected, control the movable body to move to the first position from the second position.

* * * * *